US011619225B2

(12) United States Patent
Yang et al.

(10) Patent No.: US 11,619,225 B2
(45) Date of Patent: Apr. 4, 2023

(54) IDENTIFYING POTENTIAL PROBLEMS IN A PUMPJACK

(71) Applicant: International Business Machines Corporation, Armonk, NY (US)

(72) Inventors: Yang Yang, Xi'an (CN); Chong Liu, Xi'an (CN); Si Er Han, Xi'an (CN); Xiao Ming Ma, Xi'an (CN); Jun Wang, Xi'an (CN); Chun Lei Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 17/114,869

(22) Filed: Dec. 8, 2020

(65) Prior Publication Data

US 2022/0178365 A1 Jun. 9, 2022

(51) Int. Cl.
*F04B 51/00* (2006.01)
*G06T 11/20* (2006.01)
*G06T 7/00* (2017.01)

(52) U.S. Cl.
CPC ............ *F04B 51/00* (2013.01); *G06T 7/0002* (2013.01); *G06T 11/206* (2013.01)

(58) Field of Classification Search
None
See application file for complete search history.

(56) References Cited

U.S. PATENT DOCUMENTS 4,487,061 A 12/1984 McTamaney
4,509,901 A 4/1985 McTamaney
(Continued)

FOREIGN PATENT DOCUMENTS

CN 2499674 Y 7/2002
CN 201943686 U 8/2011
(Continued)

OTHER PUBLICATIONS

Aiyejina et al., "Wax formation in oil pipelines: A critical review", International Journal of Multiphase Flow 37 (2011), pp. 671-694, doi:10.1016/j.ijmultiphaseflow.2011.02.007.
(Continued)

*Primary Examiner* — Lina M Cordero
(74) *Attorney, Agent, or Firm* — Erika R. DeCosty

(57) ABSTRACT

Methods, computer program products, and/or systems are provided that perform the following operations: obtaining a series of indicator diagrams corresponding to strokes of a pumpjack over a specific time duration, dividing each indicator diagram into a plurality of location segments in a direction of location of the rod; obtaining load difference features between upstroke loads and corresponding downstroke loads in the plurality of location segments; identifying a location segment with an abnormal load difference feature based on a time series data of load difference feature corresponding to one of the plurality of location segments, the time series data of load difference feature including a series of data points of load difference feature of the one of the plurality of location segments in time order; and providing an indication of a potential problem based, at least in part, on the identification of the location segment with an abnormal load difference feature.

20 Claims, 10 Drawing Sheets

(56) References Cited

U.S. PATENT DOCUMENTS

| | | | | |
|---|---|---|---|---|
| 4,583,915 A | * | 4/1986 | Montgomery | F04B 49/065 417/18 |
| 5,252,031 A | * | 10/1993 | Gibbs | F04B 49/02 417/18 |
| 5,458,466 A | * | 10/1995 | Mills | F04B 49/065 417/18 |
| 9,645,575 B2 | | 5/2017 | Watson | |
| 9,810,212 B2 | * | 11/2017 | Pons | F04B 47/022 |
| 2015/0148919 A1 | | 5/2015 | Watson | |
| 2015/0275651 A1 | * | 10/2015 | Chen | F04B 47/02 702/6 |
| 2017/0083819 A1 | * | 3/2017 | Li | G06N 5/045 |
| 2019/0218903 A1 | * | 7/2019 | Moreno | E21B 47/12 |
| 2020/0392833 A1 | * | 12/2020 | Sengul | G06N 20/00 |

FOREIGN PATENT DOCUMENTS

| | | | |
|---|---|---|---|
| CN | 105224716 A | | 1/2016 |
| EP | 2963234 B1 | | 6/2018 |
| WO | WO-9302289 A1 | * | 2/1993 ............ C12M 45/03 |

OTHER PUBLICATIONS

Mell et al., "The NIST Definition of Cloud Computing", Recommendations of the National Institute of Standards and Technology, Special Publication 800-145, Sep. 2011, 7 pages.

Sousa et al., "Preventing and removing wax deposition inside vertical wells: a review", Journal of Petroleum Exploration and Production Technology (2019) 9, pp. 2091-2107, <https://doi.org/10.1007/s13202-019-0609-x>.

* cited by examiner

IDENTIFYING POTENTIAL PROBLEMS IN A PUMPJACK

BACKGROUND

The present disclosure relates generally to data analysis, and more specifically to methods, systems, and computer program products for identifying a potential problem in a pumpjack.

A pumpjack (also called an oil horse or jack pump) is the over-ground drive for a reciprocating positive displacement pump in an oil well. It is used to mechanically lift liquid out of the well if not enough bottom hole pressure exists for the liquid to flow all the way to the surface. A reciprocating positive displacement pump works by repeated back-and-forth movements (e.g., strokes) of either a piston, plunger, or diaphragm.

Paraffin precipitation of pumpjack is a common issue in producing petroleum from many of the deeper wells in the world and can cause serious impediment to flow, and in some cases, a complete stoppage of flow from a well. A common solution to clear the paraffin is using a chemical paraffin remover to dissolve the paraffin.

SUMMARY

According to aspects of the present invention, there is a method, computer program product and/or system that performs the following operations (not necessarily in the following order): obtaining a series of indicator diagrams corresponding to strokes of a pumpjack over a specific time duration, each indicator diagram representing a relationship between location and load of a rod of the pumpjack throughout a stroke of the pumpjack; for each indicator diagram of the series of indicator diagrams, dividing each indicator diagram into a plurality of location segments in a direction of location of the rod; and obtaining load difference features between upstroke loads and corresponding downstroke loads in the plurality of location segments; identifying a location segment with an abnormal load difference feature based on a time series data of load difference feature corresponding to one of the plurality of location segments, wherein the time series data of load difference feature includes a series of data points of load difference feature of the one of the plurality of location segments in time order; and providing an indication of a potential problem of the pumpjack based, at least in part, on the identification of the location segment with the abnormal load difference feature.

DETAILED DESCRIPTION

Figure 1:
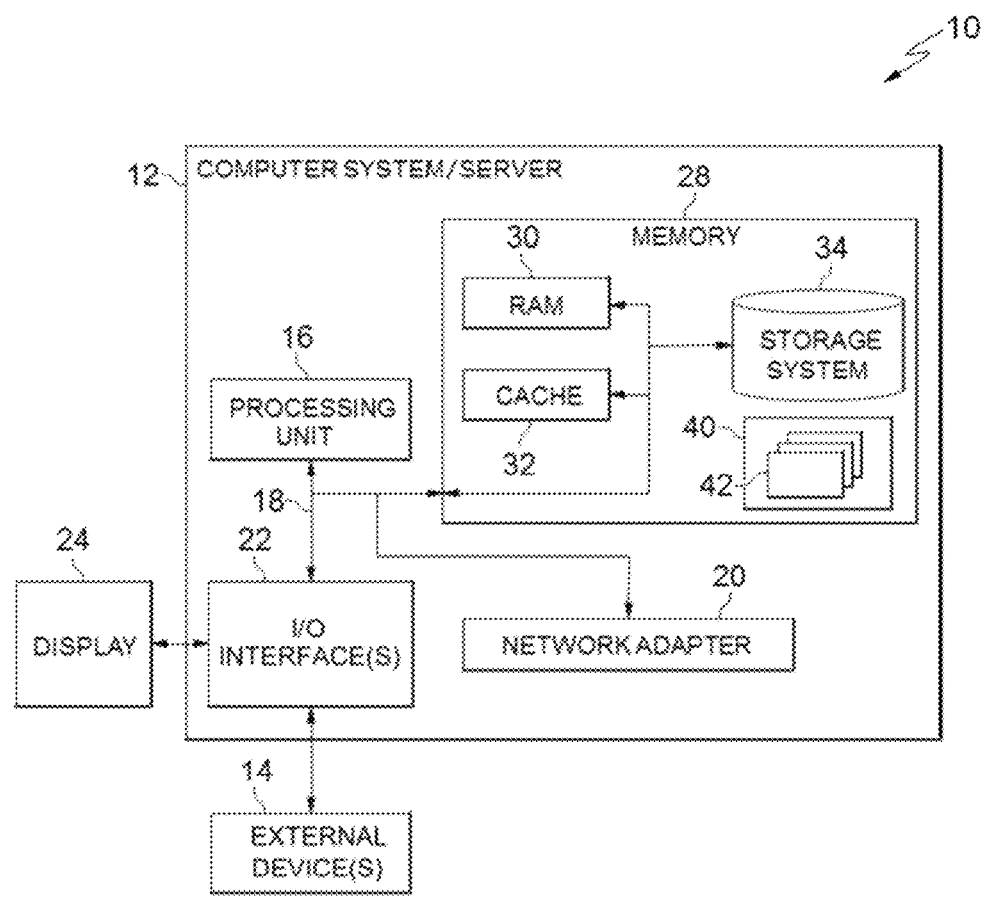
FIG. 1 depicts a block diagram of components of a computing node, according to an embodiment of the present invention.

Some embodiments will be described in more detail with reference to the accompanying drawings, in which embodiments of the present disclosure have been illustrated. However, the present disclosure can be implemented in various manners, and thus the invention should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a block diagram of example components of a computing system, such as a cloud computing node, is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 which is operational with numerous other general purpose or special purpose computing system environments or configurations. Examples of well-known computing systems, environments, and/or configurations that may be embodied by and/or suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
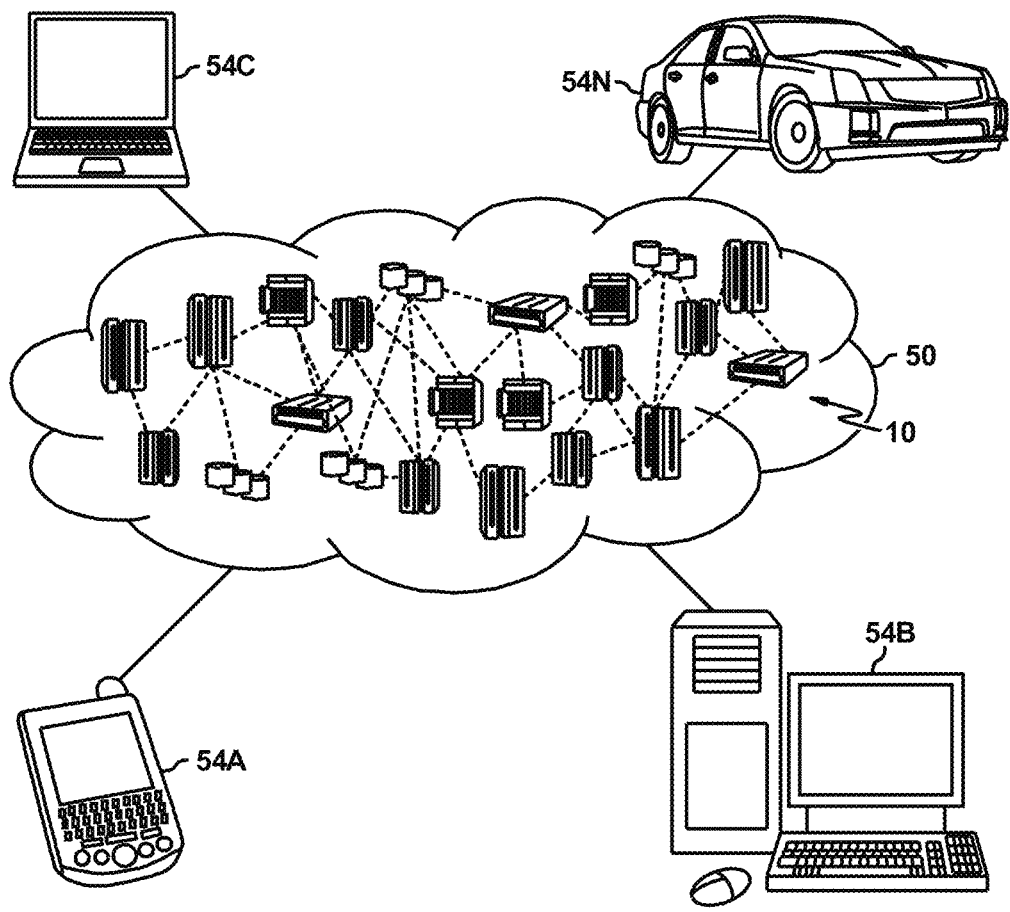
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
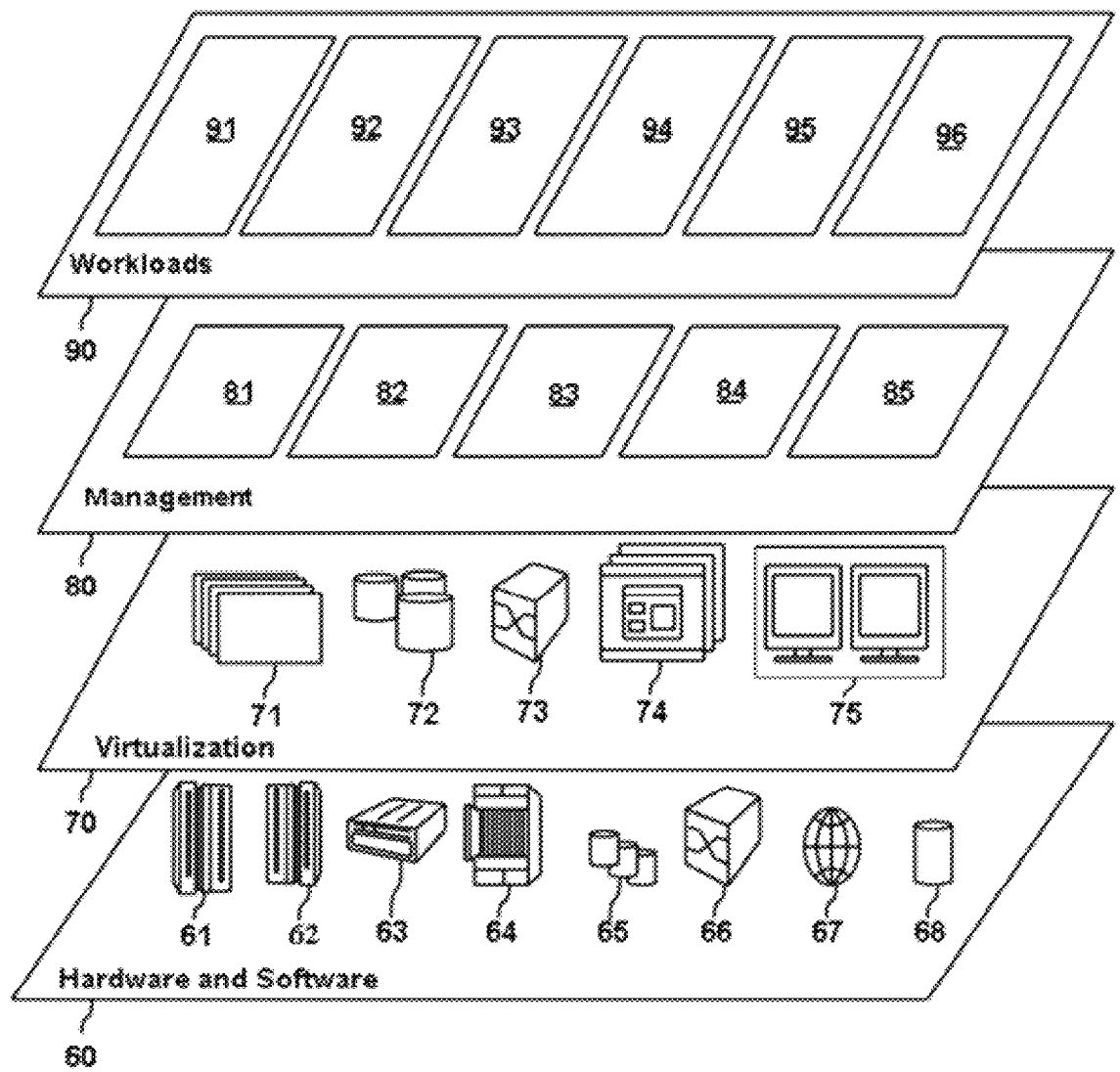
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identification of a potential problem of pumpjack 96. Hereinafter, reference will be made to FIGS. 4 through 10 to describe details of the identification of a potential problem of pumpjack 96.

A pumpjack is the over-ground drive for a reciprocating positive displacement pump in an oil well. At the bottom of the pumpjack is a down-hole pump. The pump has two valves: a stationary valve at bottom called the standing valve, and a valve on the piston connected to the bottom of the sucker rods that travels up and down as the rods reciprocate, known as the traveling valve. Reservoir fluid enters from the formation into the bottom of the borehole through perforations that have been made through the casing and cement (the casing is a larger metal pipe that runs the length of the well, which has cement placed between it and the earth; the tubing, pump, and sucker rod are all inside the casing).

When the rods at the pump end are travelling up, the traveling valve is closed, and the standing valve is open (due to the drop in pressure in the pump barrel). Consequently, the pump barrel fills with the fluid from the formation as the traveling piston lifts the previous contents of the barrel upwards. When the rods begin pushing down, the traveling valve opens and the standing valve closes (due to an increase in pressure in the pump barrel). The traveling valve drops through the fluid in the barrel (which had been sucked in during the upstroke). The piston then reaches the end of its stroke and begins its path upwards again, repeating the process.

As mentioned above, paraffin precipitation of a pumpjack is a common issue in producing petroleum from many of the deep wells in the world and can cause serious impediment to flow from a well, and in some cases, a complete stoppage of flow. Accordingly, identification of paraffin precipitation issues has become important and valuable for a pumpjack.

Additionally, finding a correct paraffin precipitation location can be important for oil well maintenance.

An indicator diagram (also called dynagraph or dynamometer card) can be an effective way to identify problems with a pumpjack. The indicator diagram is a curve with location versus load throughout a stroke. The shape of the diagram shows the details of the pumpjack conditions. By analyzing the shapes of indicator diagrams, down-hole operating conditions may be diagnosed. The indicator diagram can provide indispensable dynamic data in the management of a deep-well pump.

Figure 4A:
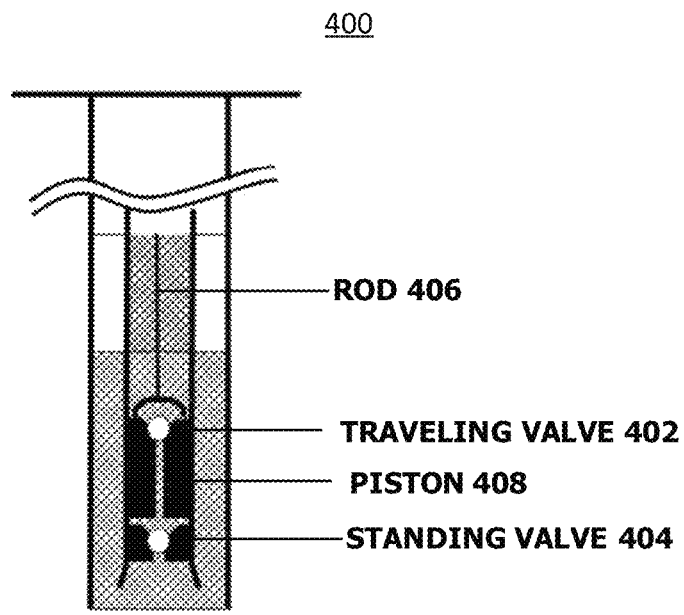
FIG. 4A depicts an example of a typical pump which may implement processes, in accordance with illustrative embodiments of the present invention.
Figure 4B:
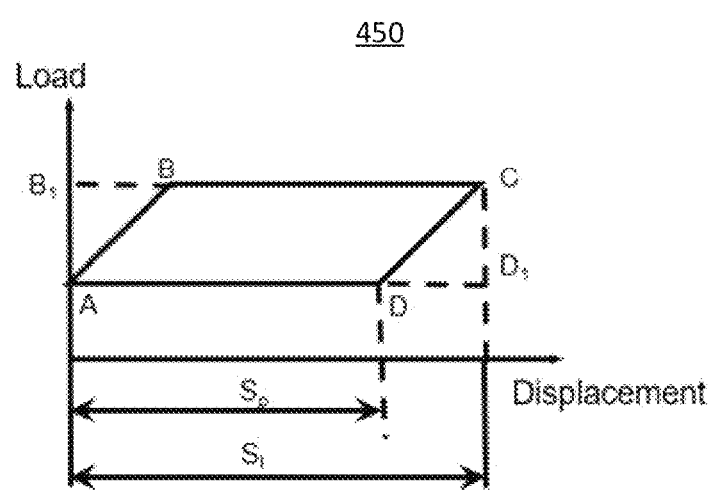
FIG. 4B depicts an example theoretical indicator diagram illustrating a working cycle of the pump depicted in FIG. 4A.

Before describing illustrated embodiments of the present invention, a typical indicator diagram will be used to illustrate the working conditions of a pumpjack, with reference to FIG. 4A and FIG. 4B. FIG. 4A depicts components of a typical pump 400 which may implement processes in accordance with illustrative embodiments of the present invention. FIG. 4B depicts a theoretical indicator diagram 450 illustrating a working cycle of the pump depicted in FIG. 4A.

The working principle of the pump is divided into two parts, namely an upstroke and a downstroke. When the upstroke begins, the horse head goes upwards, and the traveling valve 402 and the standing valve 404 are closed. The rod column bears upward stretching of the polished rod 406 and stretching of the rod column under the action of the gravity of the liquid column on the upper portion of the piston. The oil pipe column is shortened, and the suspension point load is gradually increased. The deformation is finished when the stretching limit is reached, and the load reaches the theoretical maximum value. This process is shown as the AB section in FIG. 4B. During this load process, the piston 408 does not move.

When the pressure is lower than the annular pressure of the oil sleeve, the annular well fluid of the oil sleeve pushes open the standing valve 404 to enter the pump cylinder. The piston yielding volume is filled, and the liquid in the stroke length of the piston is discharged from the wellhead. This is the process of "sucking liquid into pump, discharging liquid out of well" of the upstroke, namely the BC section as shown in FIG. 4B.

When the downstroke begins, the horse head moves downwards, and the traveling valve 402 and the standing valve 404 are closed. The rod column bears the downward pressure of the polished rod and the pushing action of well fluid in the pump cylinder to shorten, and the oil pipe column extends. The suspension point load decreases gradually. The deformation is finished when the compression limit is reached, and the load reaches the theoretical minimum value. This process is shown as the CD section in FIG. 4B. During this load reduction process, the piston 408 does not move.

As the horse head continues to move downwards, the piston 408 starts to move downwards, and the pressure in the pump cylinder is increased. When the pressure is higher than the oil sleeve annulus and the gravity of an oil pipe liquid column, the standing valve 404 is closed, and the well liquid in the pump cylinder pushes the traveling valve 402 to enter the upper part of the piston, for example, the DA section as shown in FIG. 4B. As shown in FIG. 4B, $S_l$ represents polished rod location (displacement) and $S_p$ represents piston location (displacement) during the stroke.

Many pump problems can cause a change in the area of the indicator diagram and/or a change in the level of the load on the rod. In the case of paraffin precipitation of pumpjack, during the up and down movement of the rod, the load would fluctuate, and the actual load would exceed the theoretical value due to the obstruction of the oil flow caused by the paraffin precipitation on the oil pipe. The resulting indicator diagram would become "fat" with symmetrical vibration on up and down loads.

Figure 5:
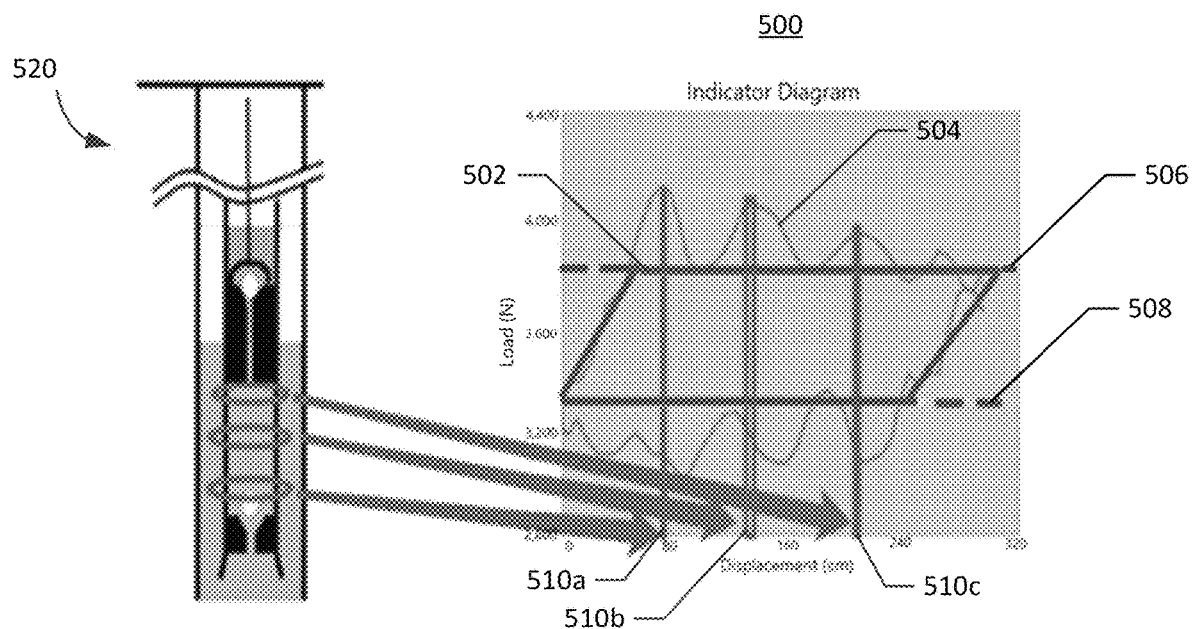
FIG. 5 depicts an example indicator diagram for a pumpjack with paraffin precipitation.

FIG. 5 depicts an example indicator diagram 500 for a pumpjack 520 with paraffin precipitation. As shown in FIG. 5, Line 502 represents a theoretical normal indicator diagram of a deep well pump, Line 504 represents a typical actual indicator diagram of deep well pump with paraffin precipitation, Level 506 represents a theoretical maximum load, Level 508 represents a theoretical minimum load, and Lines 510a-c indicate potential locations of paraffin precipitation.

Considering the above features of an indicator diagram for a pump with paraffin precipitation, according to aspects of the present disclosure, systems and methods can provide for the analysis of indicator diagrams to identify locations of a potential problems in a pumpjack. Additionally, in some embodiments, systems and methods of the present disclosure can provide indications about the severity of the problem.

Figure 6:
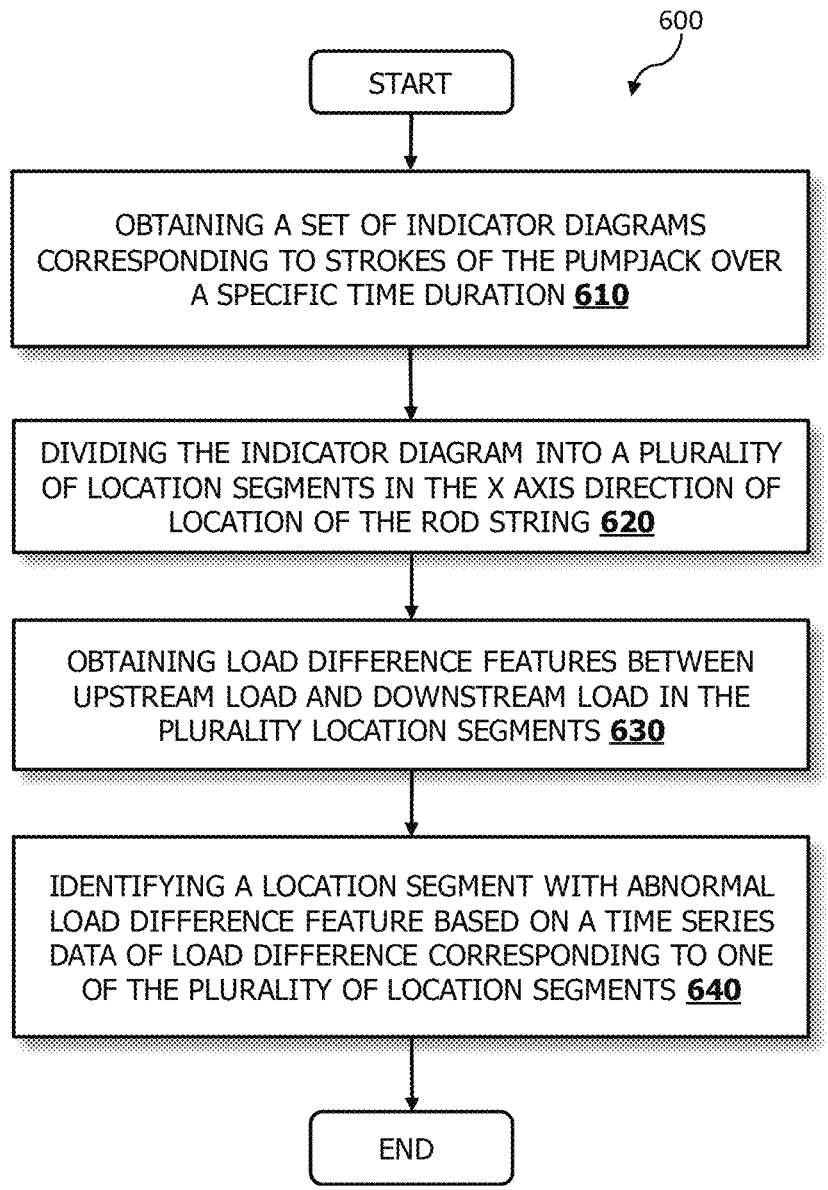
FIG. 6 is a flowchart illustrating a process for identifying a potential problem of a pumpjack, according to an illustrative embodiment of the present invention.

FIG. 6 illustrates a flowchart 600 depicting a computer-implemented method for identifying a potential problem of a pumpjack according to embodiment(s) of the present invention. The method shown in FIG. 6 may be implemented in a computing system, such as, for example, computer system/server 12 of FIG. 1. One example of the potential problem may be paraffin precipitation in the pumpjack.

In operation 610, the computing system obtains a series of indicator diagrams corresponding to strokes of a pumpjack over a specific time duration. The indicator diagrams may represent relationships between location and load of a rod of the pumpjack throughout a stroke of the pump. In the indicator diagram(s), the x axis refers to location of the rod, and the y axis refers to load of the rod.

In operation 620, for each indicator diagram of the series of indicator diagrams, the computer divides the indicator diagram into a plurality of location segments in the x axis, that is, the direction of location of the rod. In some embodiments, the number of location segments may be a predefined number. For example, in some embodiments, each stroke (x axis) can be divided into N segments from every indicator diagram. For example, a higher number of segments may make identified problem location(s) more accurate but increasing the number of segments may result in consuming more computing resources. In example embodiments of the present invention, the number of location segments may be defined as N=200, which can provide enough segments for common indicator diagram data.

Figure 7:
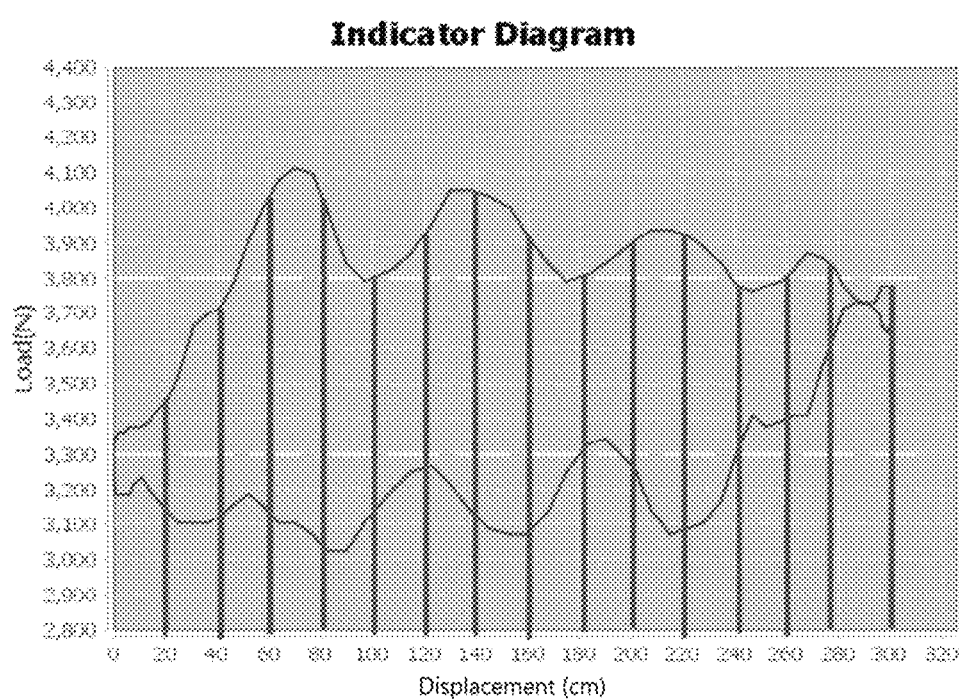
FIG. 7 depicts an example indicator diagram with location segments, according to an illustrative embodiment of the present invention.

FIG. 7 depicts an example indicator diagram 700 with location segments according to an example embodiment of the present invention. In some embodiments, the indicator diagram may be divided into segments evenly such that the location segments have the same widths on the x axis. In some embodiments, the indicator diagram may be divided into segments unevenly such that the location segments may have different widths on the x axis. For example, for locations where paraffin precipitation is more easily generated, the location segment may be divided more finely in some embodiments. In operation 620, in some embodiments, each indicator diagram of the series of indicator diagrams can be divided into a same number of location segments according to a same dividing criterion.

In operation 630, for each indicator diagram of the series of indicator diagrams, the computing system obtains load difference features between upstroke loads and corresponding downstroke loads in the plurality location segments.

According to aspects of the present invention, in some embodiments, the maximum load value in upstroke and the minimum load value in downstroke for each location segment may be used to calculate the load difference, for example:

Load Diff Feature=|upstroke Load(Max)−downstroke Load(Min)|

In some embodiments, other methods may be used to calculate the load difference features. As one example, in some embodiments, the mean load value for each upstroke and downstroke of the segment may be used to calculate the load difference.

Figure 8:
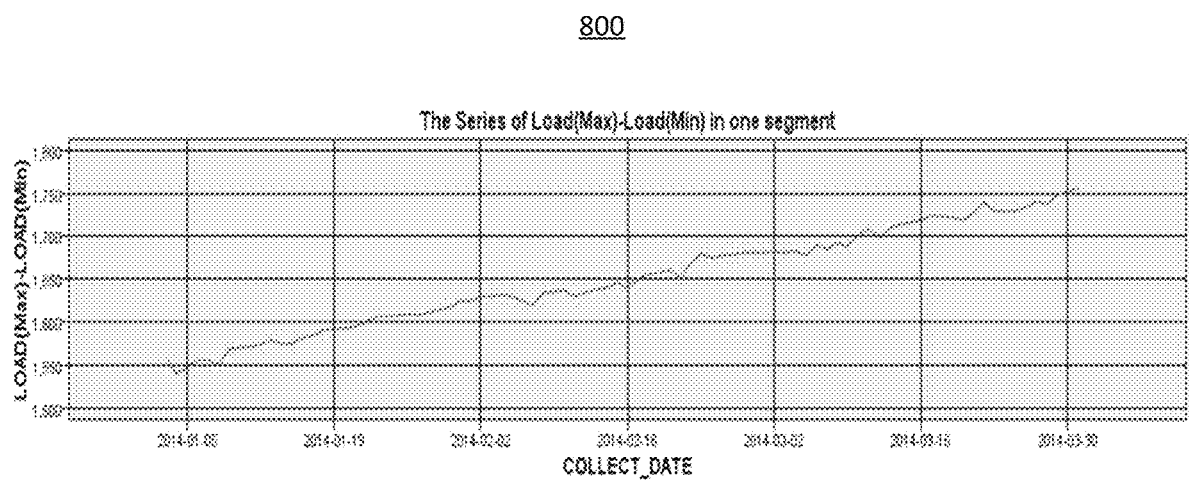
FIG. 8 depicts an example time series data of a load difference feature in one segment, according to an illustrative embodiment of the present invention.

With the load difference features obtained for each location segment in the plurality of location segments in the series of indicator diagrams at operation 630, a time series data of load difference feature corresponding to one of the plurality of location segments may be built. The time series data of load difference feature can include a series of data points of load difference feature of a specific location segment in time order. FIG. 8 depicts an example time series data 800 of load difference feature in one segment according to an example embodiment of the present invention.

In operation 640, the computing system identifies a location segment with abnormal load difference feature based on a time series data of load difference feature corresponding to one of the plurality of location segments.

As described above, as compared with a normal indicator diagram, in the case of paraffin precipitation, the resulting indicator diagram would become "fat" with symmetrical vibration on up and down loads. That is, at the location with potential paraffin precipitation, the load difference would be larger than normal. In some embodiments, based on this characteristic, the computing system identifies the abnormal load difference time point with related segment.

In some embodiments, the computing system may obtain a variation of load difference feature in the time series data of load difference feature. If the variation exceeds a predefined threshold, it may be determined that the location segment corresponding to the time series data is a segment with an abnormal load difference feature.

In some embodiments, the variation of load difference feature may be obtained by obtaining load difference features within a specified time window in the time series data of load difference feature and determining the variation of load difference feature based on the obtained load difference features. As one example, the variation may be a difference between the maximum load difference feature and the minimum load difference feature within the specific time window.

Accordingly, in response to a location with an abnormal load difference feature being identified at operation 640, a corresponding location of the rod may be identified, which may be indicated as a potential paraffin precipitation location.

In some embodiments, the computing system may further identify a trend measure of a potential problem corresponding to the identified location segment based on the time series data of load difference feature. The trend measure may indicate a change degree of the load difference features during the specific time duration. In the case of paraffin precipitation, the trend measure may indicate how rapidly the paraffin has been precipitated in the pumpjack and can be used as an indication of the severity of paraffin precipitation at the location corresponding to the identified location segment.

In some embodiments, for the time series data of load difference feature in one segment, an exponential smoothing model may be used to fit the time series data for each location segment. Exponential smoothing is a technique for smoothing time series data using the exponential window function. Whereas in a simple moving average the past observations are weighted equally, exponential functions can be used to assign exponentially decreasing weights over time. The simplest form of exponential smoothing is given by the formula:

$$S_{t+1} = \alpha Y_t + (1-\alpha) S_t$$

in which $Y_t$ is the observed load difference value in t; $S_t$ the predicted load difference value in t; and $\alpha$ is the smoothing factor with ($0 < \alpha < 1$).

In some embodiments, the key parameter of exponential smoothing model a may be used as a trend measure, Trend (t), of the time series data of load difference feature.

Figure 9:
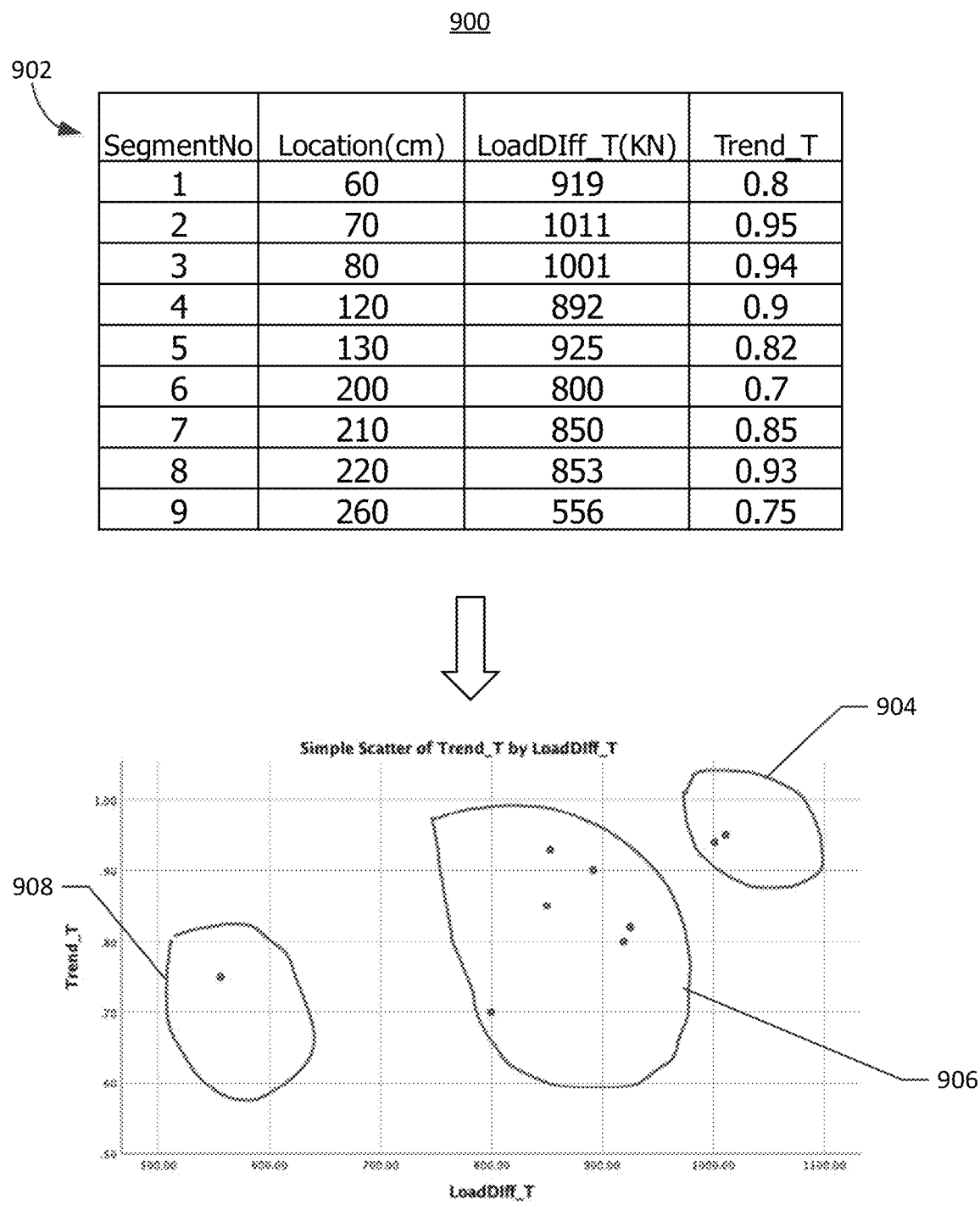
FIG. 9 depicts an example result of the classification of the identified location segments, in accordance with an illustrative embodiment of the present invention.

In some embodiments, with the variation of load difference features in the time series data and the trend measure of the location segments, the identified location segments may be classified by an unsupervised clustering method. FIG. 9 depicts an example result of the classification 900 of the identified location segments 902, according to an embodiment of the present invention. For example, as shown in FIG. 9, the data may be classified into three classes: most serious potential locations 904 (upper right part), second serious potential locations 906 (middle part), and third serious potential locations 908 (left lower part).

Accordingly, in some embodiments, the systems and methods of the present disclosure may not only identify paraffin precipitation issues for a pumpjack but may also determine locations of potential paraffin precipitation using a load difference feature. Furthermore, in some embodiments, the systems and methods of the present disclosure may identify major paraffin precipitation parts and provide data that can be used to guide paraffin cleaning work, leading to reduced costs.

Figure 10:
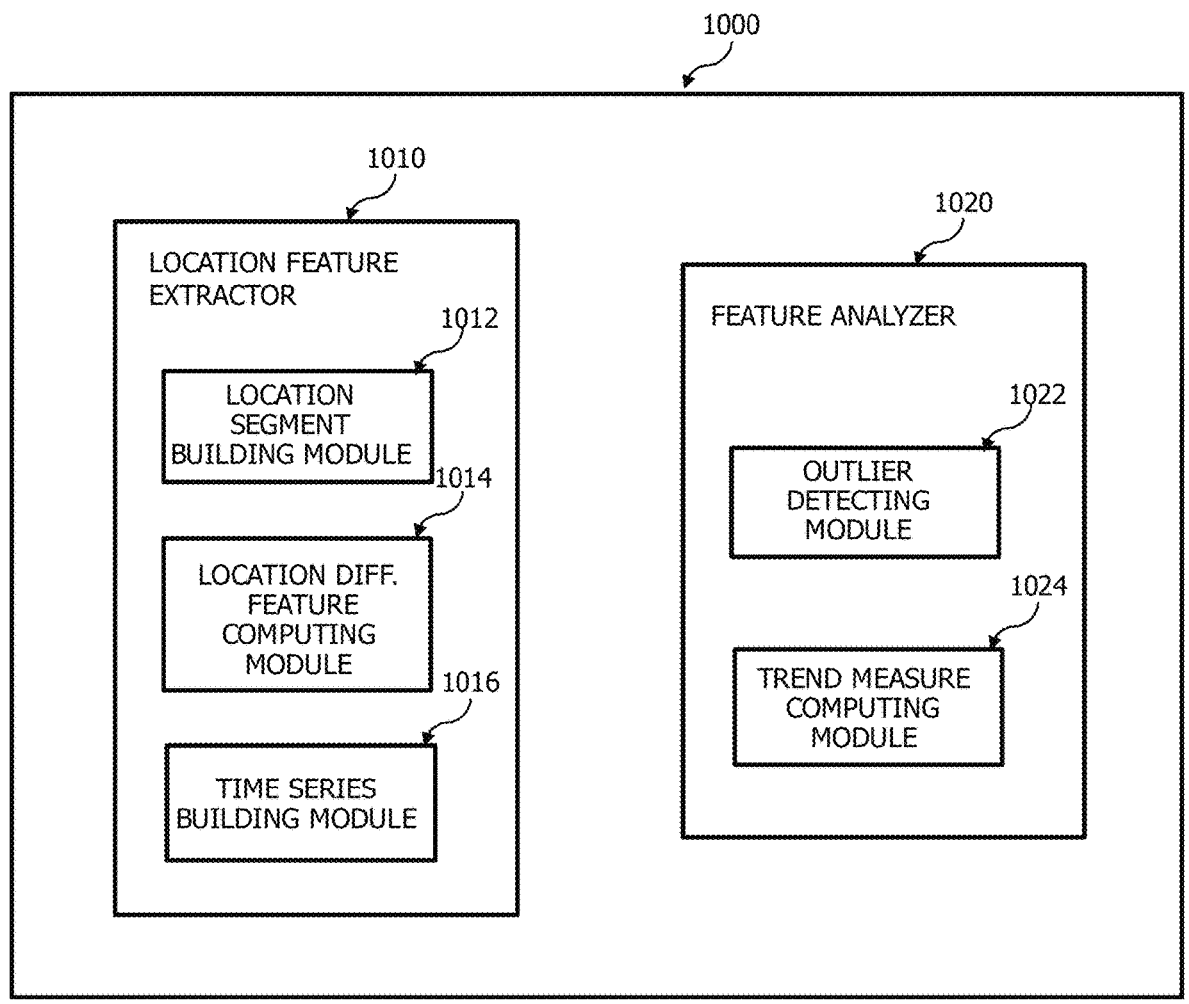
FIG. 10 depicts a block diagram illustrating an example system, according to an illustrative embodiment of the present invention.

FIG. 10 provides a diagram illustrating an example system 1000 in accordance with embodiments of the present invention. The system 1000 includes location feature extractor 1010 and feature analyzer 1020.

In some embodiments, a location feature extractor 1010 may obtain a series of indicator diagrams corresponding to strokes of the pumpjack over a specific time duration and extract location features from the indicator diagrams, for example, as described with regard to FIG. 6. In some embodiments, location feature extractor 1010 may include a location segment building module 1012, a load difference feature computing module 1014, and a time series data building module 1016.

Upon receiving a series of indicator diagrams representing strokes of a pumpjack over a specific time duration, location segment building module 1012 may divide each indicator diagram into a predefined number of location segments. For example, each stroke (e.g., x axis) can be divided into N segments from every indicator diagram of a pumpjack.

Load difference feature computing module 1014 may calculate the load difference feature between the upstroke load and downstroke load in each location segment. In some embodiments, the maximum load value in upstroke and minimum load value in downstroke for each segment may be used to calculate the load difference feature. In some embodiments, other method, for example, mean value for each upstroke or downstroke segment, may be used to calculate load difference feature.

Based on the load difference features obtained for each location segment in the plurality of location segments in the series of indicator diagrams, time series data building module 1016 may build a time series data of load difference feature corresponding to one of the plurality of location segments. The time series data of load difference feature can include a series of data points of load difference feature of a specific location segment in time order.

The time series data of load difference feature can be provided to feature analyzer 1020 to identify a location segment with abnormal load difference feature.

In some embodiments, feature analyzer 1020 may include an outlier detecting module 1022 and a trend measure computing module 1024. The outlier detecting module 1022 may detect abnormal load difference time point(s) in each time series data, and the corresponding segment(s) may be treated as potential paraffin precipitation location(s). In some embodiments, the outlier detecting module 1022 may obtain a variation of load difference feature in the time series data of load difference features and compare the variation with a predefined threshold. If the variation exceeds a predefined threshold, the outlier detecting module 1022 may determine that the location segment corresponding to the time series data is a segment with abnormal load difference feature.

In some embodiments, the variation of load difference feature may be obtained by obtaining load difference features within a specified time window in the time series data of load difference feature and determining the variation of load difference feature based on the obtained load difference features. For example, the variation may be a difference between the maximum load difference feature and the minimum load difference feature within the specific time window.

The trend measure computing module 1024 may identify a trend measure of the potential problem corresponding to the identified location segment based on the time series data of load difference feature. In some embodiments, the trend measure computing module 1024 may use an exponential smoothing model to fit the time series data for each location segment load difference data and use a key parameter of exponential smoothing model, for example, a smoothing factor $\alpha$ as Trend(t).

It should be noted that although the illustrative embodiments of the present invention have been described with paraffin precipitation as an example of potential problem in the pumpjack, the illustrative embodiments of the present invention may be used to identify other problems in the pumpjack which may result in load difference changes in the indicator diagram.

Accordingly, embodiments of the present invention provide a computer-implemented method, computer system, and computer program product for identifying a potential problem of a pumpjack. The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
obtaining a series of indicator diagrams corresponding to strokes of a pumpjack over a specific time duration, each indicator diagram representing a relationship between location and load of a rod of the pumpjack throughout a stroke of the pumpjack;
for each indicator diagram of the series of indicator diagrams:
dividing each indicator diagram into a plurality of location segments in a direction of the location of the rod, and
obtaining load difference features between upstroke loads and corresponding downstroke loads in the plurality of location segments;
identifying a location segment with an abnormal load difference feature based on a time series data of load difference feature corresponding to one of the plurality of location segments, wherein the time series data of load difference feature includes a series of data points of load difference feature of the one of the plurality of location segments in time order; and providing an indication of a potential pumpjack problem based, at least in part, on identification of the location segment with the abnormal load difference feature.

2. The computer-implemented method of claim 1, further comprising:

identifying a trend measure of the potential pumpjack problem corresponding to the identified location segment based on the time series data of load difference feature, wherein the trend measure indicates a change degree of the load difference features during the specific time duration.

3. The computer-implemented method of claim 2, further comprising:

classifying identified location segments based on a variation of load difference feature in the time series data of load difference feature and trend measures of the identified location segments.

4. The computer-implemented method of claim 2, wherein identifying the trend measure of the potential pumpjack problem corresponding to the identified location segment based on the time series data of load difference feature comprises:

fitting the time series data of load difference feature for the location segment using an exponential smoothing model; and providing a smoothing factor of the exponential smoothing model as the trend measure.

5. The computer-implemented method of claim 1, wherein identifying the location segment with the abnormal load difference feature based on the time series data of load difference feature corresponding to one of the plurality of location segments comprises:

obtaining a variation of load difference feature in the time series data of load difference feature corresponding to one of the plurality of location segments; and identifying the location segment with the abnormal load difference feature in response to the variation of load difference of a specific location segment exceeding a threshold.

6. The computer-implemented method of claim 5, wherein obtaining the variation of load difference feature in the time series data of load difference feature comprises:

obtaining the load difference features within a specified time window in the time series data of load difference feature; and determining the variation of load difference feature based on the load difference features within the specified time window.

7. The computer-implemented method of claim 6, wherein the variation of load difference feature is a difference between a maximum load difference feature and a minimum load difference feature within the specified time window.

8. A computer system comprising:
one or more processing units; and
a memory coupled to the one or more processing units and storing instructions thereon, the instructions, when executed by the one or more processing units, performing operations comprising:

obtaining a series of indicator diagrams corresponding to strokes of a pumpjack over a specific time duration, each indicator diagram representing a relationship between location and load of a rod of the pumpjack throughout a stroke of the pumpjack;

for each indicator diagram of the series of indicator diagrams:

dividing each indicator diagram into a plurality of location segments in a direction of the location of the rod, and obtaining load difference features between upstroke loads and corresponding downstroke loads in the plurality of location segments;

identifying a location segment with an abnormal load difference feature based on a time series data of load difference feature corresponding to one of the plurality of location segments, wherein the time series data of load difference feature includes a series of data points of load difference feature of the one of the plurality of location segments in time order; and providing an indication of a potential pumpjack problem based, at least in part, on the identification of the location segment with the abnormal load difference feature.

9. The computer system of claim 8, the operations further comprising:

identifying a trend measure of the potential pumpjack problem corresponding to the identified location segment based on the time series data of load difference feature, wherein the trend measure indicates a change degree of the load difference features during the specific time duration.

10. The computer system of claim 9, the operations further comprising:

classifying identified location segments based on a variation of load difference feature in the time series data of load difference feature and trend measures of the identified location segments.

11. The computer system of claim 9, wherein identifying the trend measure of the potential pumpjack problem corresponding to the identified location segment based on the time series data of load difference feature comprises:

fitting the time series data of load difference feature for the location segment using an exponential smoothing model; and providing a smoothing factor of the exponential smoothing model as the trend measure.

12. The computer system of claim 8, wherein identifying the location segment with the abnormal load difference feature based on the time series data of load difference feature corresponding to one of the plurality of location segments comprises:

obtaining a variation of load difference feature in the time series data of load difference feature corresponding to one of the plurality of location segments; and identifying the location segment with the abnormal load difference feature in response to the variation of load difference of a specific location segment exceeding a threshold.

13. The computer system of claim 12, wherein obtaining the variation of load difference feature in the time series data of load difference feature comprises:

obtaining the load difference features within a specified time window in the time series data of load difference feature; and determining the variation of load difference feature based on the load difference features within the specified time window.

14. The computer system of claim 13, wherein the variation of load difference feature is a difference between a maximum load difference feature and a minimum load difference feature within the specified time window.

15. A computer program product comprising a non-transitory computer readable storage medium having stored thereon:
program instructions programmed to obtain a series of indicator diagrams corresponding to strokes of a pumpjack over a specific time duration, each indicator diagram representing a relationship between location and load of a rod of the pumpjack throughout a stroke of the pumpjack;
for each indicator diagram of the series of indicator diagrams:
program instructions programmed to divide each indicator diagram into a plurality of location segments in a direction of the location of the rod, and
program instructions programmed to obtain load difference features between upstroke loads and corresponding downstroke loads in the plurality of location segments;
program instructions programmed to identify a location segment with an abnormal load difference feature based on a time series data of load difference feature corresponding to one of the plurality of location segments, wherein the time series data of load difference feature includes a series of data points of load difference feature of the one of the plurality of location segments in time order; and
program instructions programmed to provide an indication of a potential pumpjack problem based, at least in part, on the identification of the location segment with the abnormal load difference feature.

16. The computer program product of claim 15, the non-transitory computer readable storage medium having further stored thereon:
program instructions programmed to identify a trend measure of the potential pumpjack problem corresponding to the identified location segment based on the time series data of load difference feature, wherein the trend measure indicates a change degree of the load difference features during the specific time duration.

17. The computer program product of claim 16, the non-transitory computer readable storage medium having further stored thereon:
program instructions programmed to classify the identified location segments based on a variation of load difference feature in the time series data of load difference feature and trend measures of the identified location segments.

18. The computer program product of claim 16, wherein the program instructions programmed to identify the trend measure of the potential pumpjack problem corresponding to the identified location segment based on the time series data of load difference feature comprises:
program instructions programmed to fit the time series data of load difference feature for the location segment using an exponential smoothing model; and
program instructions programmed to provide a smoothing factor of the exponential smoothing model as the trend measure.

19. The computer program product of claim 15, wherein the program instructions programmed to identifying the location segment with the abnormal load difference feature based on the time series data of load difference feature corresponding to one of the plurality of location segments comprise:
program instructions programmed to obtain a variation of load difference feature in the time series data of load difference feature corresponding to one of the plurality of location segments; and
program instructions programmed to identify the location segment with the abnormal load difference feature in response to the variation of load difference of a specific location segment exceeding a threshold.

20. The computer program product of claim 19, wherein the program instructions programmed to obtain the variation of load difference feature in the time series data of load difference feature comprises:
program instructions programmed to obtain the load difference features within a specified time window in the time series data of load difference feature; and
program instructions programmed to determine the variation of load difference feature based on the load difference features within the specified time window.

* * * * *